United States Patent [19]
Tabuchi et al.

[11] Patent Number: 5,325,248
[45] Date of Patent: Jun. 28, 1994

[54] ROTARY HEAD ASSEMBLY

[75] Inventors: Toshiaki Tabuchi, Nara; Kyoji Kasuga, Tenri, both of Japan

[73] Assignee: Sharp Kabushiki Kaisha, Osaka, Japan

[21] Appl. No.: 817,262

[22] Filed: Jan. 3, 1992

[30] Foreign Application Priority Data

| Jan. 8, 1991 [JP] | Japan | 3-000469 |
| Jan. 21, 1991 [JP] | Japan | 3-005380 |

[51] Int. Cl.$^5$ ............................................. G11B 5/027
[52] U.S. Cl. ........................................ 360/84; 360/108
[58] Field of Search .............................. 360/84–85, 360/108

[56] References Cited

U.S. PATENT DOCUMENTS

| 4,031,558 | 6/1977 | Kusaka | 360/108 X |
| 4,117,519 | 9/1978 | Shioyama et al. | |
| 4,875,110 | 10/1989 | Kazama et al. | |

FOREIGN PATENT DOCUMENTS

| 0336422 | 4/1989 | European Pat. Off. | |
| 2369646 | 5/1978 | France | |
| 59-178601 | 10/1984 | Japan | 360/108 |
| 63159941 | 1/1990 | Japan | |
| 63159942 | 1/1990 | Japan | |
| 63159943 | 1/1990 | Japan | |
| 63159944 | 1/1990 | Japan | |

OTHER PUBLICATIONS

Patent Abstract of Japan, vol. 13, No. 505 (P-959) (3853) Nov. 14, 1989 "Revolving Head Device" Hitachi Ltd.
Patent Abstract of Japan vol. 14, No. 419 (P-1103) (4362) Sep. 10, 1990 "Rotary Head Device" Matsushita Electric Ind. Co. Ltd.

*Primary Examiner*—A. J. Heinz
*Attorney, Agent, or Firm*—David G. Conlin; George W. Neuner

[57] ABSTRACT

A rotary head assembly has a first positioning surface and a second positioning surface provided in a rotary yoke. The first positioning surface contacts an end surface of a rotor of a rotary transformer. The second positioning surface contacts an outer peripheral surface of the rotor of the rotary transformer. A rotary yoke is fixed on the rotor by magnetic force by a motor. The rotary yoke is positioned by the first positioning surface in a thrust direction, and by the second positioning surface in a radial direction. Thus, the rotary yoke can be easily and precisely attached.

3 Claims, 8 Drawing Sheets

ROTARY HEAD ASSEMBLY

BACKGROUND OF THE INVENTION

1. Field of the Invention

The present invention relates to a rotary head assembly used in a VTR, a R-DAT and the like. More specifically, the present invention relates to a rotary head assembly having a rotor of a motor for rotatably driving a rotary drum contained in the rotary drum.

2. Description of the Background Art

Figure 11:
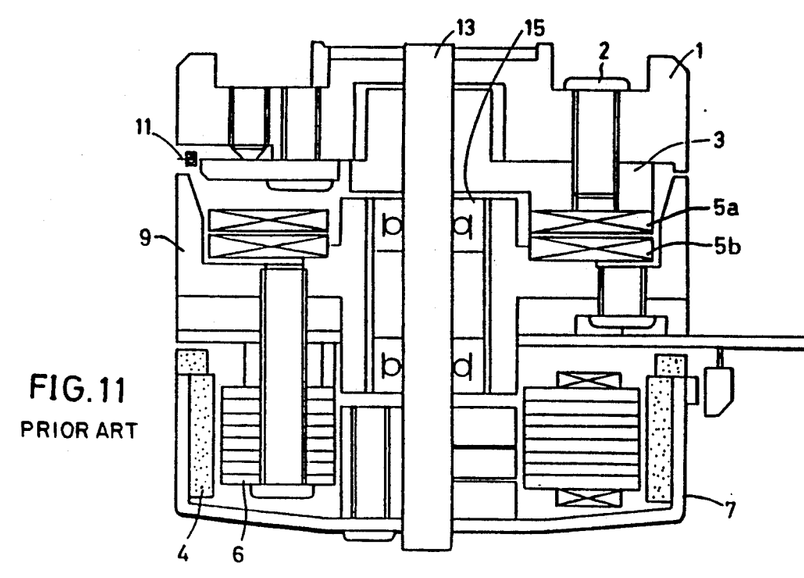
FIG. 11 is a cross sectional view of one example of a conventional rotary head assembly.

FIG. 11 is a cross sectional view of a conventional rotary head assembly. The rotary head assembly includes a rotary drum 1, a fixed drum 9, a motor 7 and a rotation shaft 13. The rotation shaft 13 is rotatably held by a ball bearing 15. An outer ring of ball bearing 15 is attached to fixed drum 9 by shrinkage fitting and adhesion.

A rotary drum 1 is arranged at a position opposing fixed drum 9. A disk 3 is attached to rotation shaft 13. Rotary drum 1 is attached to disk 3 by means of a fitting screw 2. If rotary drum 1 is directly attached to the shaft 13 of rotation, precision of height of a magnetic head 11 and the like becomes inferior. For this reason, rotary drum 1 is attached to disk 3 in order to improve precision in attaching rotary drum 1. Magnetic head 11 is attached on an end surface of rotary drum 1. Magnetic head 11 is rotated to scan a magnetic tape (not shown).

A rotor 5a of a rotary transformer is attached to disk 3 by adhesion. A stator 5b of the rotary transformer is attached to fixed drum 9 by adhesion. Rotor 5a and stator 5b of the rotary transformer are opposing to each other. A prescribed air gap is provided between rotor 5a and stator 5b of the rotary transformer. The rotary head assembly transmits and receives electric signals to and from magnetic head 11 by means of this rotary transformer. This rotary transformer is a flat type one.

Rotary drum 1 is arranged at one end portion of rotation shaft 13. Motor 7 is arranged at the other end portion of rotary shaft 13. Rotor 6 of the motor is attached to fixed drum 9. The shaft 13 is rotatably driven by means of motor 7. Members rotated by the rotation of shaft 13 include rotary drum 1, rotor 5a of the rotary transformer, disk 3 and magnetic head 11.

Problems of the rotary head assembly shown in FIG. 11 will be described in the following. Since the rotary head assembly has been reduced in size recently, rotation shaft 13 has been made thinner. If rotation shaft 13 is thin, it is likely to be twisted when rotation shaft 13 is rotatably driven by means of motor 7. When rotation shaft 13 is twisted, a jitter is generated. The jitter appears as a distortion on a TV screen.

Figure 12:
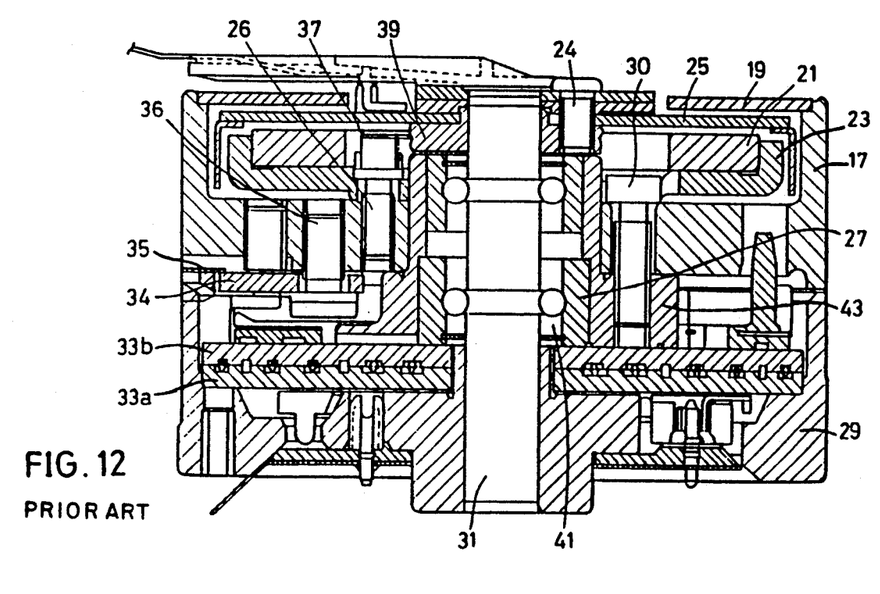
FIG. 12 is a cross sectional view of a rotary head assembly disclosed in Japanese Patent Laying-Open No. 2-9013.

A rotary head assembly disclosed in Japanese Patent Laying-Open No. 2-9013 has been proposed to solve this problem. FIG. 12 is a cross sectional view of the rotary head assembly disclosed in this Japanese Patent Laying-Open No. 2-9013. The rotary head assembly includes a rotary drum 17, a fixed drum 29 and a fixed shaft 31.

Figure 13:
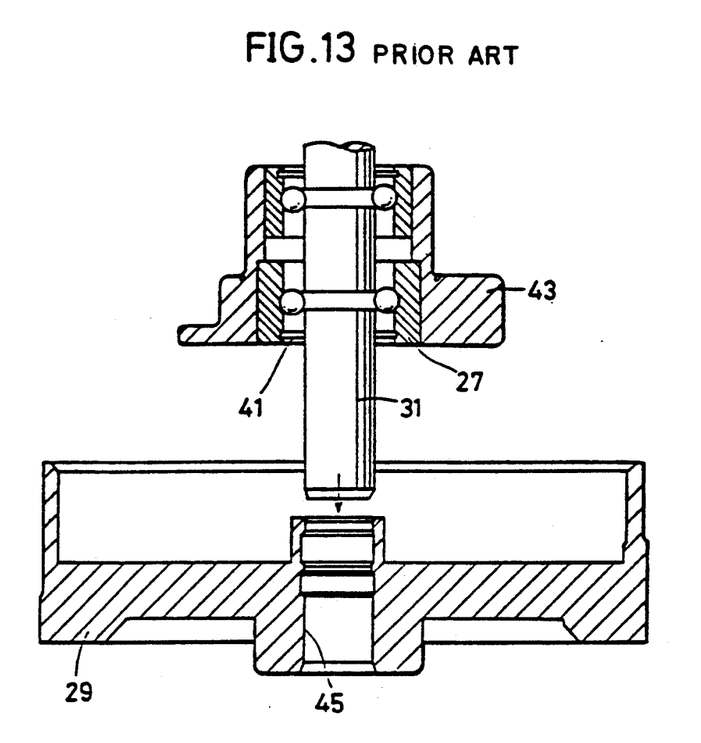
FIG. 13 is a cross sectional view illustrating fixation of the fixed shaft on the fixed drum shown in FIG. 12.

Fixed shaft 31 is inserted through ball bearing 41. A disk 43 is attached on an outer ring 27 of ball bearing 41. By press fitting the fixed shaft 31 to a hole portion 45 provided on the fixed drum 29, as shown in FIG. 13, the fixed shaft 31 is attached to fixed drum 29.

As shown in FIG. 12, rotary drum 17 is arranged to oppose to fixed drum 29. Rotary 17 is attached to disk 43 by means of a fitting screw 30. A head base 34 is attached on a side surface of rotary drum 17 by means of a fitting screw 36. A head chip 3 is attached at a tip end portion of head base 34. Head base 34 and head chip 35 constitute a magnetic head.

An earth ring 39 is attached to fixed shaft 31. Stator 25 of the motor is attached to earth ring 39 by means of a fitting screw 24. A yoke 23 is attached to rotary drum 17 by means of a fitting screw 26. A magnet 21 is attached to yoke 23. Yoke 23 and magnet 21 constitute a rotor of the motor. A rotary yoke 19 which is a metal plate is attached to rotary drum 17. By means of the rotary yoke 19, a magnetic path is formed between magnet 21 and rotary yoke 19. Therefore, magnetic force of magnet 21 is effectively applied to stator 25.

An earthing brush is attached to yoke 23. Earthing brush 37 is in contact with earth ring 39. When rotary drum 17 rotates, earthing brush 37 rotates around earth ring 39 while contacting earth ring 39. Rotary drum 17 is grounded by means of this earthing brush 37.

A stator 33a of rotary transformer is attached to fixed drum 29. A rotor 33b of rotary transformer is attached to rotary drum 17. Stator 33a and rotor 33b of the rotary transformer are opposing to each other. A prescribed air gap is provided between stator 33a and rotor 33b of rotary transformer.

In the rotary head assembly shown in FIG. 12, members which are rotated include rotary drum 17, rotary yoke 19, magnet 21, yoke 23, rotor 33b of the rotary transformer, head base 34, head chip 35, earthing brush 37, ball bearing 41 and disk 43.

In the rotary head assembly shown in FIG. 12, rotor (yoke 23, magnet 21) of the motor for rotatably driving rotary drum driving rotary drum 17 is attached to rotary drum 17. Therefore, even if the shaft 31 is thin, the fixed shaft 31 is not twisted.

The problems of the rotary head assembly shown in FIG. 12 will be described in the following.

(1) Processing of disk 43 is carried out by rotating disk 43. As the fixed shaft 31 is attached to fixed drum 29, processing of disk 43 becomes impossible. Therefore, before attaching fixed shaft 31 onto the fixed drum 29, disk 43 must be processed. In this case, if the fixed shaft 31 is attached inclined on the fixed drum 29, the rotary drum 17 cannot be attached but inclined.

(2) In the rotary head assembly, a flat type rotary transformer is used. Since the rotary head assembly is made smaller and smaller, the rotary transformer becomes thinner. The rotary transformer is processed by grinding. If the rotary transformer is thin, it may possibly warp during grinding. If such a rotary transformer is used, the air gap between the stator 33a and rotor 33b of the rotary transformer cannot be precisely provided.

(3) In the rotary head assembly, the rotary drum 17 is grounded by the contact between earthing brush 37 and earth ring 39 provided on the outer ring of fixed shaft 31. Resistance at the contact between earthing brush 37 and earth ring 39 has effected the precision of rotation of the rotary drum 17.

(4) Since the rotary head assembly is made smaller, thickness of the outer periphery of the rotary drum 17 is also made thinner. In order to rotate rotary drum 17 with less power consumption, it is preferred to position the motor on outermost side. Since the outer periphery of rotary drum 17 is thin and the motor is positioned on the outer side, magnetic tape is affected by the magnetic force of the motor.

(5) The fixed shaft 31 is attached to fixed drum 29 by press fitting. Therefore, it was difficult to accurately provide the air gap between rotor 33b and stator 33a of the rotary transformer.

(6) Rotor 33b of the rotary transformer to rotary drum 17 was done by adhesion. Therefore, rotor 33b of the rotary transformer could not be changed.

SUMMARY OF THE INVENTION

An object of the present invention is to provide a rotary head apparatus having a structure allowing improved precision in assembly.

Another object of the present invention is to provide a rotary head assembly having a structure allowing improved precision in assembly and improved precision in rotation of the rotary drum.

A further object of the present invention is to provide a rotary head assembly having a structure allowing improved precision in assembly, and in which magnetic tape is not affected by the magnetic force from the motor rotatably driving the rotary drum.

A still further object of the present invention is to provide a rotary head assembly having a structure allowing improved precision in assembly and easier attachment of rotary yoke.

A still further object of the present invention is to provide a rotary head apparatus having a structure allowing improved precision in assembly and exchange of the rotor of the rotary transformer.

According to one aspect of the present invention the rotary head assembly includes: a rotary drum on which a magnetic head is attached; a rotation shaft fixedly attached to the rotary drum; a fixed drum for rotatably holding the rotation shaft and arranged opposing to the rotary drum; and a motor for rotatably driving the rotary drum. The motor includes a stator attached to the fixed drum, and a rotor attached on the rotary drum to be opposed to the stator.

According to a second aspect, the rotary head assembly of the present invention includes a shielding member for shielding the magnetic tape from magnetism from the motor, provided between the magnetic tape and a space formed by the rotor and the stator of the motor.

In accordance with a third aspect, the rotary head assembly of the present invention transmits and receives electric signals to and from the rotary drum and the fixed drum, and it includes a coaxial type rotary transformer provided coaxially with the rotation shaft. The coaxial type rotary transformer includes a cylindrical rotor attached to rotary drum, and a cylindrical stator attached to a fixed drum arranged to oppose to the inner surface of the rotor. In accordance with the third aspect, the assembly further includes a pressing surface provided on the outer peripheral surface of the rotor of the coaxial type rotary transformer, and a pressing member detachably attached on the rotary drum for depressing the pressing surface so as to attach the rotor of the coaxial type rotary transformer onto the rotary drum.

According to a fourth aspect, the rotary head assembly of the present invention includes a rotary yoke arranged opposing to the stator of the motor and arranged to sandwich, together with the rotor of the motor, the stator of the motor. The rotary yoke contacts the rotor of the rotary transformer and rotates together with the rotor of the rotary transformer. The rotary yoke includes a first positioning surface which contacts an end surface of the rotor of the rotary transformer for positioning the rotary yoke in the thrust direction, and a second positioning surface which contacts an outer peripheral surface of the rotor of the rotary transformer for positioning the rotary yoke in the radial direction.

In the rotary head assembly in accordance with the present invention, the disk can be rotated by rotating the rotation shaft after the rotation shaft is held by the fixed drum. Therefore, even after the rotation shaft is held by the fixed drum, the disk can be processed.

In the rotary head assembly in accordance with the present invention, a coaxial type rotary transformer is used. Therefore, even if the rotary transformer is made thin, it does not warp.

In the rotary head assembly in accordance with the present invention, the rotary drum is grounded by bringing a terminal into contact with an end surface of the rotation shaft. The resistance at the contact portion between the terminal and the end surface of the rotation shaft does not match effect the precision in rotation of the rotary drum.

The rotary head assembly in accordance with the present invention shields the magnetic tape from magnetism of the motor by means of a shield member.

Therefore, the magnetic tape is hardly affected by the magnetism of the motor.

Since the rotary yoke is fixed to the rotary drum by the magnetic force of the motor in the rotary head assembly in accordance with the present invention, the rotary yoke can be easily attached.

Further, the rotor of the rotary transfer is used for positioning the rotary yoke. Since the rotary transformer is processed by grinding, precision in processing can be made high. Therefore, use of the rotor of the rotary transformer in positioning improves accuracy of the arrangement of the rotary yoke.

In the rotary head assembly in accordance with the present invention, the rotor of the rotary transformer is pressed onto the rotary drum by means of a pressing member. The pressing member is detachably provided on the rotary drum. Therefore, the rotor of the rotary transformer can be changed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
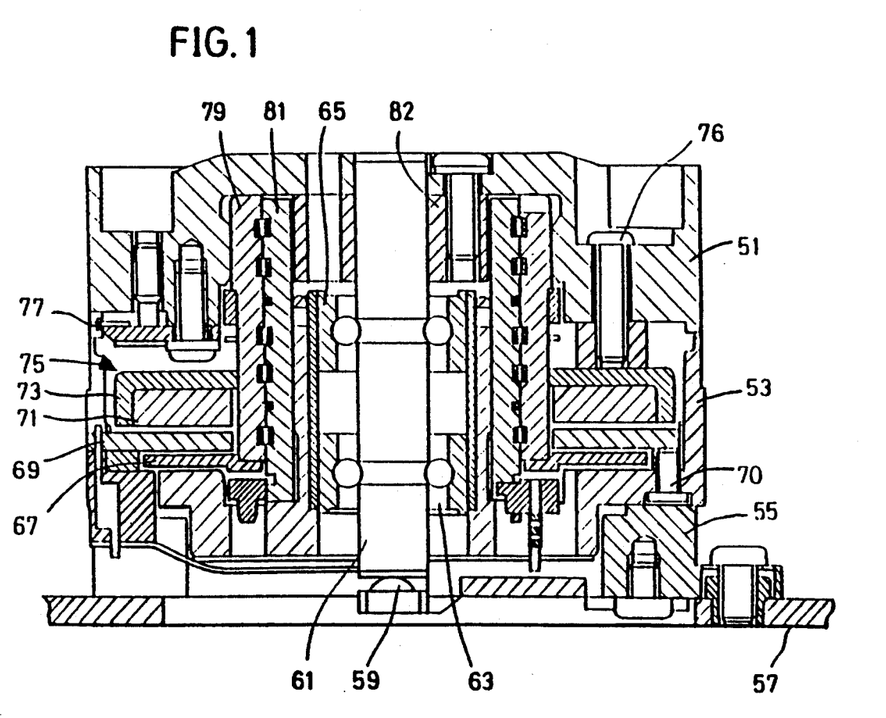
FIG. 1 is a cross sectional view of one embodiment of the rotary head assembly in accordance with the present invention.

FIG. 1 is a cross sectional view of one embodiment of the rotary head assembly in accordance with the present invention. The rotary head assembly includes a rotary drum 51, a fixed drum 53, a ball bearing 63 and a rotation shaft 61.

Ball bearing 63 rotatably supports the rotation shaft 61. Fixed drum 53 fixes an outer ring 65 of ball bearing 63. Outer ring 65 is fixed to the fixed drum 53 by shrinkage fitting and adhesion. Fixed drum 53 is attached to a V base 55. V base 55 is attached on a mechanism chassis 57. An earthing brush 59 is attached to mechanism chassis 57. Earthing brush 59 is in contact with an end surface of rotation shaft 61.

A disk 82 is attached to rotation shaft 61. Rotary drum is attached to disk 82. In one embodiment of the rotary head assembly in accordance with the present invention, a coaxial type rotary transformer is used. A rotor 79 of the rotary transformer is attached to rotary drum 51. A stator 81 of rotary transformer is attached to fixed drum 53 The rotary transformer transmits electric signals to the magnetic head and receives electric signals from the magnetic head. The magnetic head 77 is attached on rotary drum 51.

Rotor 75 of the motor includes a yoke 73 and a magnet 71. Rotor 75 of the motor is attached to rotary drum 51 by means of a fitting screw 76. A rotary yoke 67 is provided at an end surface of rotor 79 of the rotary transformer. Rotary yoke 67 is fixed to rotor 79 of the rotary transformer by the attraction force from magnet 71.

Stator 69 of the motor is attached to fixed drum 53 by means of a fitting screw 70. Stator 69 of the motor opposes to rotor 75 of the motor.

Referring to FIG. 1, elements which rotate include rotary drum 51, rotation shaft 61, rotary yoke 67, rotor 75 of the motor, magnetic head 77, rotor 79 of the rotary transformer, and disk 82.

Outer ring 65 of ball bearing 63 and fixed drum 53 are fixed by shrinkage fitting and adhesion. Therefore, compared with the case when they are fixed by press fitting, the amount of air gap between rotor 75 of the motor and stator 69 of the motor can be accurately adjusted.

In addition, since this 82 can be processed after ball bearing 63 is fixed to fixed drum 53, rotary drum 51 can be attached with high precision.

Rotor 75 of the motor for rotatably driving rotary drum 51 is fixed to rotary drum 51, and therefore torsion can be prevented, and precision in rotation can be improved.

Since the rotary transformer is coaxial type, there is less variation of opposing areas in the core compared with a flat type one. Since the opposing areas in the core are uniform, the transmission characteristic of the rotary transformer is the same in every channel. Therefore, characteristic adjustment of recording/reproducing amplifier and the like is not necessary.

In addition, since the rotary transformer is coaxial type, it does not warp during processing even if the rotary transformer is thin.

Earthing brush 59 is in contact with the end surface of rotary shaft 61. Therefore, compared with the rotary head assembly shown in FIG. 12, precision in rotation of the rotary drum 51 can be improved.

Figure 2:
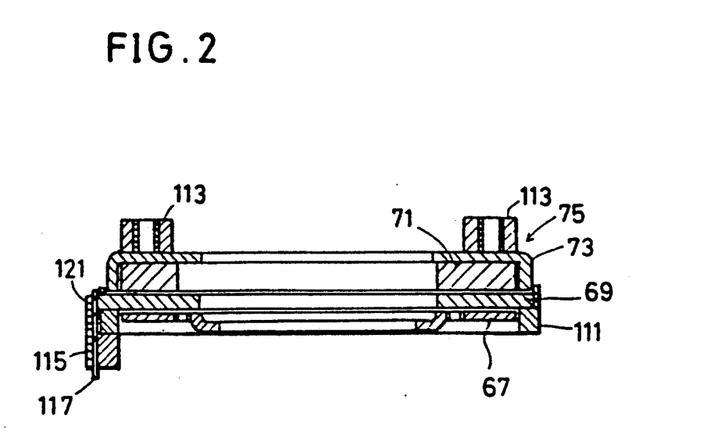
FIG. 2 is a cross sectional view of a motor provided in one embodiment of the rotary head assembly in accordance with the present invention.
Figure 3:
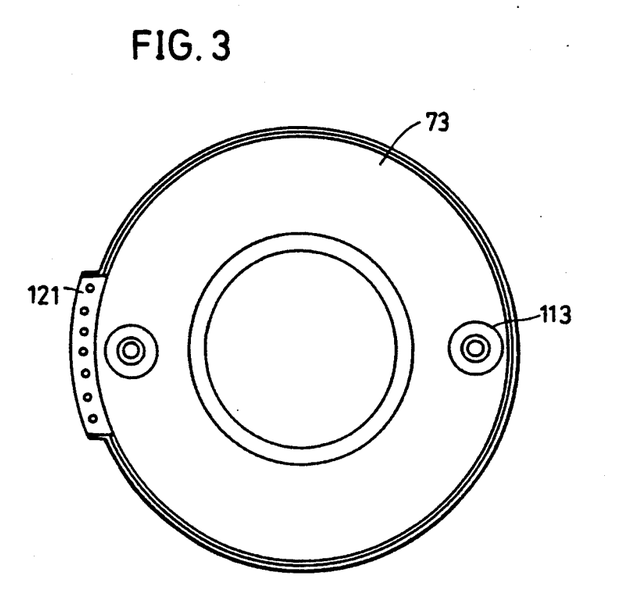
FIG. 3 is a plan view of the motor shown in FIG. 2.
Figure 4:
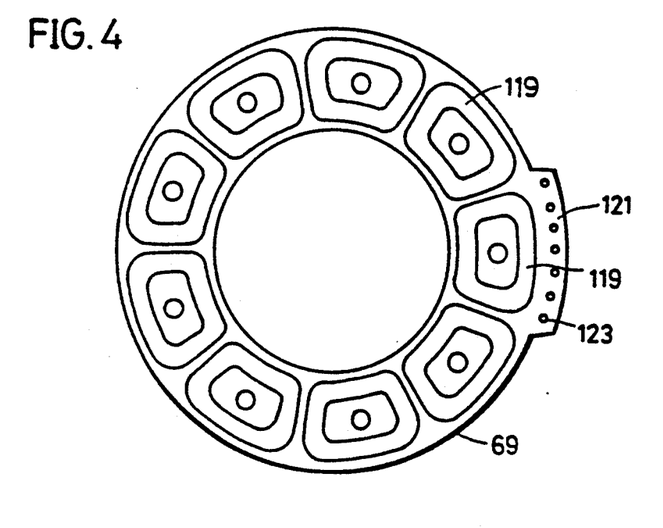
FIG. 4 is a plan view of a stator of the motor shown in FIG. 2.
Figure 5:
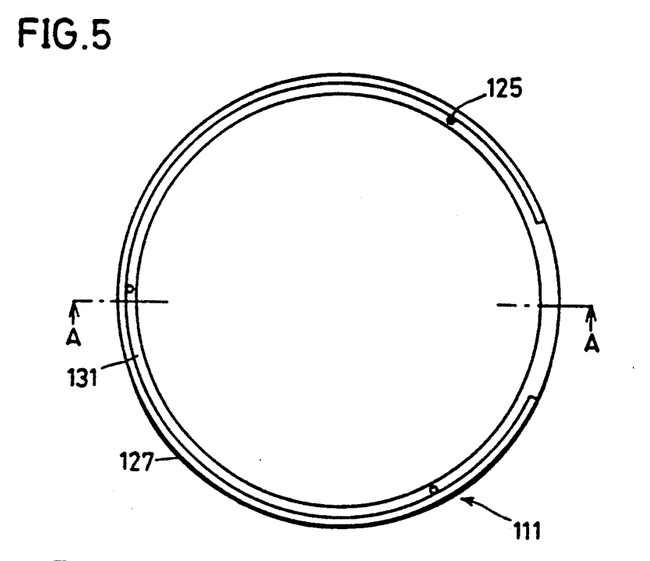
FIG. 5 is a plan view of a shield ring supporting the stator of the motor shown in FIG. 2.
Figure 6:
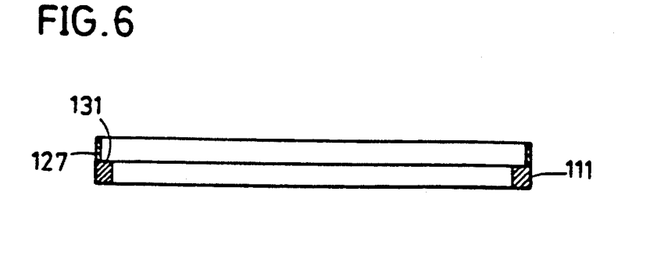
FIG. 6 is a sectional view of the shield ring shown in FIG. 5 taken from the direction of the arrow A.

FIG. 2 is a cross sectional view of a motor provided in one embodiment of the rotary head assembly in accordance with the present invention. FIG. 3 is a plan view of the motor shown in FIG. 2. FIG. 4 is a plan view of a stator 69 of the motor shown in FIG. 2. FIG. 5 is a plan view of a shield ring 111 supporting stator 69 of the motor shown in FIG. 2. FIG. 6 is a cross sectional view of the shield ring 111 shown in FIG. 5 taken from the direction of the arrow A.

As shown in FIG. 2, rotor 75 of the motor is formed by attaching magnet 71 to yoke 73. By fixing a fitting boss 113 provided on yoke 73 to rotary drum 51 shown in FIG. 1 by means of a fitting screw 76, rotor 75 of the motor is attached to rotary drum 51.

As shown in FIG. 2, stator 69 of the motor is attached to shield ring 111. Shield ring 111 serves to maintain flatness of rotor 69 of the motor.

As shown in FIGS. 2 and 4, a projecting portion 121 is provided on stator 69 of the motor. As shown in FIG. 4, a connecting hole 123 is provided at projecting portion 121. Stator 69 of the motor has a ring shape. A plurality of driving coils 119 are provided on stator 69 of the motor. Projecting portion 121 provides electric connection between driving coils 119 and connecting pins 117 provided at a lead wiring member 115.

When connecting hole 123 shown in FIG. 4 is provided at a portion for forming driving coil 119 of stator 69 of the motor, the driving coils 119 positioned at that portion becomes smaller than driving coil 119 positioned at other portions. Therefore, magnetic flux generated from the driving coil 119 at the connection hole becomes smaller than the magnetic flux generated from other magnetic coils 119 positioned at other portions.

The magnetomotive force F is represented as $F = B \cdot I \cdot l$ (B: flux density, I: current, l: effective length of coil). The driving coil 119 at the connection hole has smaller coil area than other coils, that is, shorter effective length of the coil, which results in smaller magnetomotive force. If the same magnetomotive force (as provided by an example in which all coils have the same size) is to be provided, the current must be increased, as apparent from the above expression. Consequently, much power is consumed. However, since the driving coils 119 have the same size in the present invention, such problem does not occur.

As shown in FIG. 5, a stator fixing portion 131 is provided on shield ring 111. A rising portion 127 is provided around stator fixing portion 131. rising portion 127 is not provided at a portion corresponding to projecting portion 121 shown in FIG. 4. A fixed tapped hole 125 is provided on shield ring 111. By fitting the screw 70 shown in FIG. 1 into tapped hole 125, shield ring 111 is fixed on fixed drum 53. Shield ring 111 is formed of a magnetic material such as permalloy.

Figure 7:
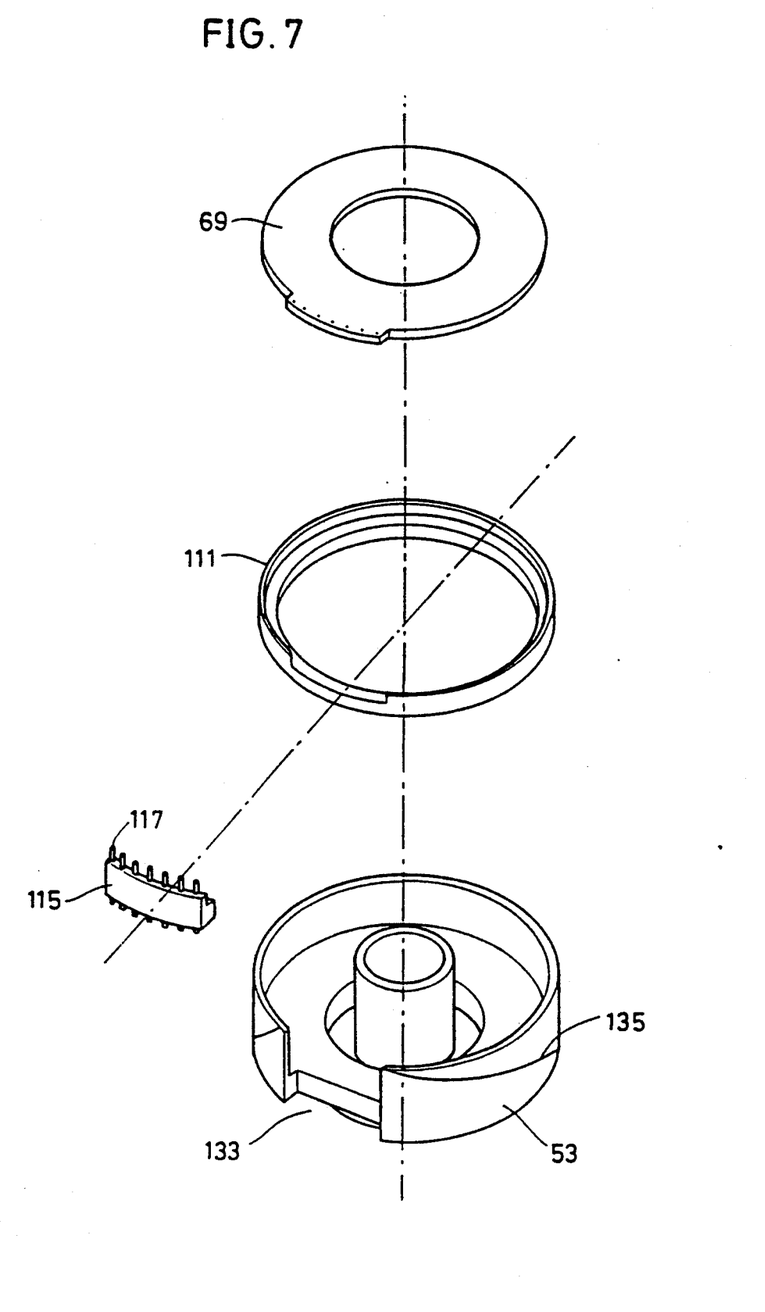
FIG. 7 is a perspective view showing the state of attachment of the stator of the motor shown in FIG. 4.

FIG. 7 is a perspective view showing the state of attachment of stator 69 of the motor shown in FIG. 4. A step is provided on the outer periphery of fixed drum 53, which step serves as a lead portion 135. The lead portion 135 regulates traveling of magnetic tape. In one embodiment of the rotary head assembly in accordance with the present invention, a notched portion 133 is provided at that portion of the outer peripheral surface of the fixed drum 53 at which magnetic tape is not wound, and a lead wiring member 115 having a connecting pin 117 attached thereto is fit in notched portion 133.

Figure 8:
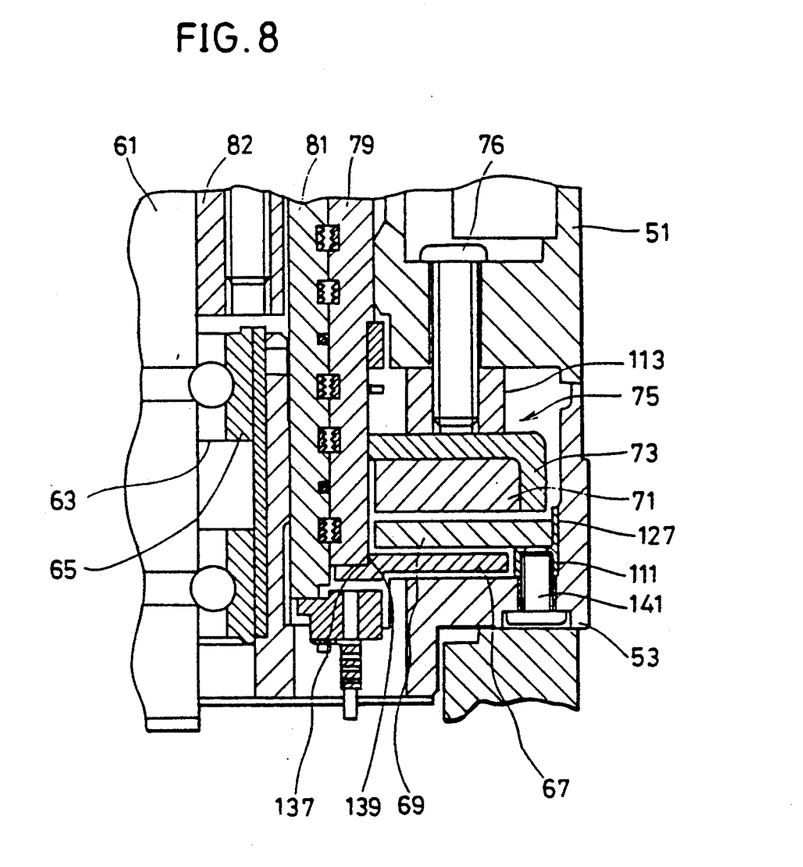
FIG. 8 is an enlarged sectional view of a motor provided in one embodiment of the rotary head assembly in accordance with the present invention.

FIG. 8 is an enlarged sectional view of a motor provided in one embodiment of the rotary head assembly in accordance with the present invention. A ball bearing 63 rotatably supports a rotation shaft 61. An outer ring 65 of ball bearing 63 is fixed by a fixed drum 53. A shield ring 111 is attached to fixed drum 53 by means of a fitting screw 141. Shield ring 111 supports stator 69 of the motor. There is rising portion 127 provided on shield ring 111 between stator 69 of the motor and fixed drum 53.

A disk 82 is attached to rotation shaft 61. Rotary drum 51 is attached to disk 82. A rotor 79 of a rotary transformer is attached to rotary drum 51. A stator 81 of rotary transformer is attached to fixed drum 53.

Rotor 75 of the motor includes a magnet 71 attached to a yoke 73. By fitting a fitting screw 76 into fitting boss 113 provided on yoke 73, the rotor 75 of the motor is attached to rotary drum 51.

Rotary yoke 67 includes a first positioning surface 137 and a second positioning surface 139. Positioning of rotary yoke 67 in the thrust direction is carried out by first positioning surface 137. Positioning of rotary yoke 67 in the radial direction is done by second positioning surface 139.

Since recent rotary head assemblies are made smaller and smaller, thickness of the outer peripheral portion of the fixed drum 53 becomes thinner. At present, outer peripheral portion of the fixed drum 53 having the thickness as thin as about 0.6 mm has been known. Meanwhile, in order to increase the number of rotation of the motor with less power, the motor should be provided as far away from rotation shaft 61 as possible. If the motor is provided far from rotation shaft 61, the distance between magnetic tape and the motor becomes shorter, and accordingly, the magnetic tape is affected by the magnetic force of the motor. In one embodiment of the rotary head assembly in accordance with the present invention, a rising portion 127 is provided to entirely surround the gap between the rotary yoke 67 and the rotor 75 of the motor. The length of rising portion 127 along the longitudinal direction of rotation shaft 61 is the same or longer than the distance of this gap.

Therefore, influence of the magnetic force from stator 69 of the motor on magnetic tape can be prevented. The effect of magnetic shield can be expected if the rising portion 127 has the thickness of 0.1 mm or larger.

As shown in FIG. 8, in one embodiment of the rotary head assembly in accordance with the present invention, rotary yoke 67 is positioned by rotor 79 of the rotary transformer. Since the rotary transformer is processed by grinding, high precision in processing is possible. Since rotor 79 of the rotary transformer is used as a reference for positioning rotary yoke 67, rotary yoke 67 can be arranged accurately. In addition, since rotary yoke 67 is attached by using attraction force from magnet 71, rotary yoke 67 can be easily attached to rotor 79 of the rotary transformer.

Figure 9:
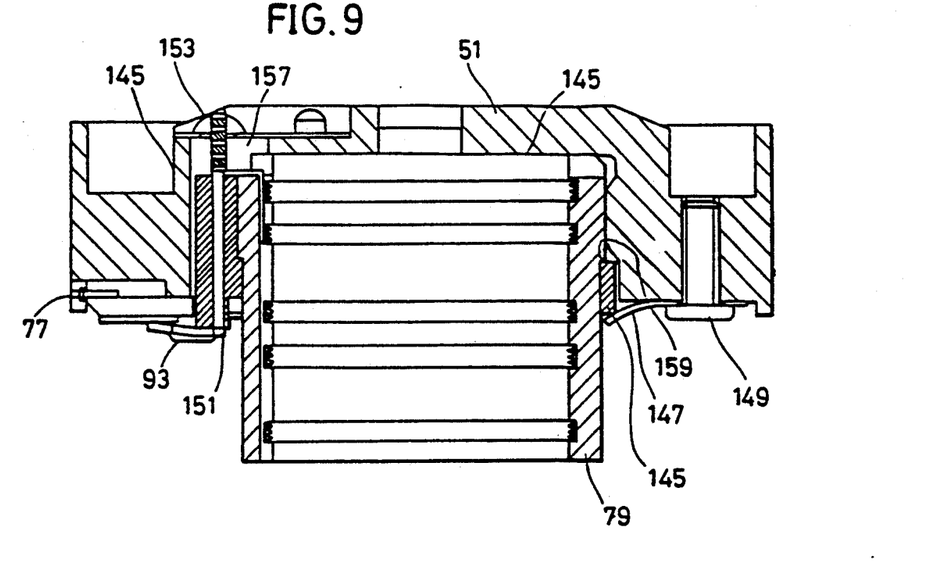
FIG. 9 is a sectional view showing the state of attachment of the rotor of a rotary transformer provided in one embodiment of the rotary head assembly in accordance with the present invention.
Figure 10:
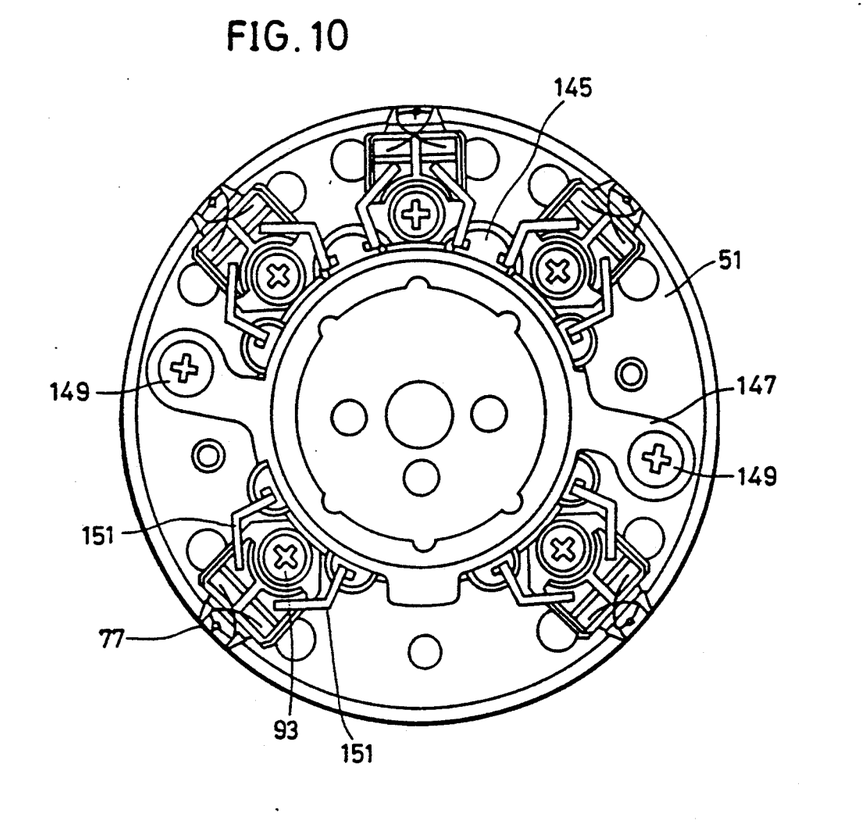
FIG. 10 is a plan view showing the state of attachment of the rotor of the rotary transformer provided in one embodiment of the rotary head assembly in accordance with the present invention.

FIG. 9 is a cross sectional view showing the state of attachment of the rotor of the rotary transformer provided in one embodiment of the rotary head assembly in accordance with the present invention. FIG. 10 is a plan view showing the state of attachment of the rotor of the rotary transformer provided in one embodiment of the rotary head assembly in accordance with the present invention. As shown in FIG. 9, rotor 79 of the rotary transformer is positioned in the thrust direction by a reference surface 143 provided on rotary drum 51. A stop is provide on the outer periphery of rotor 79 of the rotary transformer. A ring 145 is fixed by adhesive on the outer periphery of the rotor 79 of the rotary transformer. Ring 145 is positioned by a suppressing surface 159 of the step provided on the outer peripheral surface of rotor 79 of the rotary transformer.

Rotor 79 of the rotary transformer is attached on rotary drum 51 by depressing ring 145 by a leaf spring 147. Leaf spring 147 is attached to rotary drum 51 by means of a fitting screw 149. Magnetic head 77 is electrically connected to a terminal plate 89. Reference numeral 93 denotes a screw for fixing magnetic head 77 to rotary drum 51.

A lead pin 151 is attached to ring 145. A connecting portion 153 between one end portion of lead pin 151 and wiring of rotor 179 of the rotary transformer is in a through hole 157 provided in rotary drum 51. The other end of lead pin 151 is electrically connected to terminal plate 89.

As shown in FIGS. 9 and 10, rotor 79 of the rotary transformer is attached to rotary drum 51 by means of leaf spring 147 in one embodiment of the rotary head assembly in accordance with the present invention. Therefore, rotor 79 of the rotary transformer can be exchanged. Ring 145 is provided between rotor 79 of the rotary transformer and leaf spring 147 from the following reason. Namely, rotor 79 of the rotary transformer is formed of ferrite, which is a brittle material. Therefore, if rotor 79 of the rotary transformer is directly depressed by leaf spring 147, rotor 79 of the rotary transformer may be damaged. Ring 145 should preferably be made of a soft material such as resin.

As shown in FIG. 9, in one embodiment of the rotary head apparatus in accordance with the present invention, one end portion of lead pin 151 is connected to rotor 79 of the rotary transformer through the through hole 157 provided in rotary drum 51. Therefore, soldering of the connecting portion 153 is easy. The other end portion of lead pin 151 is adapted to contact terminal plate 190 when rotary 79 of the rotary transformer is attached to rotary drum 51. If there is no possibility of rotor 79 of the rotary transformer being damaged when rotor 79 of the rotary transformer is directly depressed by leaf spring 147, ring 145 is not necessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rotary head assembly for scanning a magnetic tape by rotating a magnetic head, comprising:
   a rotary drum on which said magnetic head is attached;
   a rotation shaft fixedly attached to said rotary drum;

a fixed drum rotatably supporting said rotation shaft and arranged opposed to said rotary drum;

wherein electric signals are transmitted and received to and from said rotary drum and said fixed drum;

a motor for rotatably driving said rotary drum;

wherein said motor includes a stator attached to said fixed drum, and a rotor attached on said rotary drum opposed to said stator;

a coaxial type rotary transformer provided coaxially with said rotation shaft;

said coaxial type rotary transformer including a cylindrical rotor attached to said rotary drum;

a cylindrical stator arranged to oppose an inner surface of said rotor of said rotary transformer and attached on said fixed drum; and a rotary yoke opposed to the stator of said motor and arranged to sandwich the stator of said motor with the rotor of said motor;

said rotary yoke being in sliding contact with the rotor of said rotary transformer and adapted to rotate with the rotor of said rotary transformer;

wherein said rotary head assembly further comprises:

a pressing surface provided on an outer peripheral surface of the rotor of said coaxial type rotary transformer, and a pressing member detachably provided on said rotary drum for pressing said pressing surface of the rotor of said coaxial type rotary transformer onto said rotary drum.

2. The rotary head assembly according to claim 1, wherein said pressing member includes a ring arranged on an outer peripheral surface of the rotor of said coaxial type rotary transformer, and a leaf spring having one end fixed by means of a screw on said rotary drum and the other end arranged to depress said ring.

3. The rotary head assembly according to claim 2, wherein a conductive member electrically connecting said magnetic head with the rotor of said rotary transformer penetrates through said ring.

* * * * *